Patented Sept. 28, 1954

2,690,435

UNITED STATES PATENT OFFICE 2,690,435

PROTECTION OF RUBBER BY STANNOUS COMPLEX

Harry E. Albert, Akron, Ohio, assignor to The Firestone Tire & Rubber Company, Akron, Ohio, a corporation of Ohio No Drawing. Original application April 4, 1949, Serial No. 85,473, now Patent No. 2,626,954, dated January 27, 1953. Divided and this application April 25, 1952, Serial No. 285,793

6 Claims. (Cl. 260—29.7)

This invention relates to the stabilization of rubbers and, more particularly, rubber-like copolymers of a conjugated diene monomer and a vinyl aromatic monomer, typified by GR-S. The conjugated diene monomers which may be used in such copolymers include butadiene (by which is meant the compound butadiene 1-3), isopreme, 2-cyanobutadiene, cyclopentadiene, piperylene, dimethylbutadiene, 2-methyl-1,3-pentadiene, etc. The vinyl aromatic monomers include styrene, nuclear-substituted styrenes, alphamethylstyrene, monochlorostyrene, dichlorostyrene, vinylnaphthalene, vinylbiphenyl, vinylcarbazole, 2-vinyl-5-ethylpyridine, 2-ethyl-5-vinylpyridine, etc. The invention includes the new stabilizers, their use in the rubber-like copolymers, and the stabilized products.

The stabilizers most generally used with such a copolymer, such as the well-known phenyl-beta-naphthylamine, on aging discolor the copolymer and light-colored vulcanizates prepared from the copolymer. These light-colored vulcanizates are badly discolored when exposed to ultraviolet light. The stabilizers of the present invention are nondiscoloring. They stabilize both the uncured copolymer and the vulcanizate. They are, therefore, advantageously added to the emulsion of the copolymer obtained on emulsion copolymerization so that on coagulation they are uniformly distributed in the coagulum and stabilize it during drying and subsequent treatment.

The tin complexes of this invention are produced by reacting stannous chloride or other water-soluble stannous salt of a strong acid, a phenolic compound, and alkali in solution. They are light-colored and, therefore, contain no tin oxide which is a black compound. They contain more tin than calculated for the tin salt of the phenolic compound. Their structure is unknown. They may be tin oxide polymers stabilized by the phenolic compound having a formula such as RO—Sn—O—Sn—O—SnOH, where R is an aromatic residue. One of the terminal hydroxyls in this suggested molecule may to some extent be replaced by chlorine or other acid radical—depending upon the tin salt used in producing the complex. There is little fact to support such a suggested structure, and it may be far from the actual structure.

The complexes may be produced from a phenolic compound such as:

Phenol
p-Tertiary-octylphenol
p-Cyclohexylphenol
p-Tertiary-butylphenol
Cresylic acid (a mixture of phenols derived from petroleum)
4,6-di-tertiary-butyl-m-cresol
2,6-di-tertiary-butyl-p-cresol
Salicylic acid
p-Hydroxy benzoic acid
p-Aminophenol
p-Nitrophenol
Alpha-amino-beta-naphthol
Alpha-chloro-beta-naphthol
o-Chlorophenol
p-Phenylphenol
4-tertiary-butyl-m-cresol
p-Bromophenol
Alpha-naphthol
Beta-naphthol
Tertiary-butyl-beta-naphthol
1,5-dihydroxynaphthalene
Hydroquinone
Resorcinol The stannous salts used in the preparation of the complexes are stannous salts of strong acids and include stannous chloride, stannous bromide, stannous sulfate, stannous benzene sulfonate, stannous toluene sulfonate, stannous naphthalene sulfonate, etc.

The following examples illustrate the preparation of the complexes:

EXAMPLE 1

STANNOUS COMPLEX OF PHENOL

Twenty grams of sodium hydroxide were dissolved in 200 cubic centimeters of water, and then 47 grams of phenol were dissolved in the resulting solution. A solution of 47.4 grams of stannous chloride (anhydrous) in 100 cubic centimeters of water was added slowly during stirring. The precipitate was filtered, washed, and dried at 90° C. The yield was 45.0 grams. The precipitate was white and when heated over an open flame it decomposed before melting. It underwent no apparent change on heating one hour at 150° C. On analysis, it yielded 61.02 per cent of tin; whereas the calculated content for the normal stannous salt is 38.9%. The chlorine content was 2.66 per cent.

EXAMPLE 2

STANNOUS COMPLEX OF BETA-NAPHTHOL

Seventy-two grams of beta-naphthol were dissolved in one liter of methanol, and to this was added a solution of 20 grams of sodium hydroxide in 200 cubic centimeters of water. A solution of 47.4 grams of stannous chloride in 100 cubic centimeters of 50 per cent ethanol was then added slowly during stirring. The product was filtered and washed twice with alcohol. It was dried and found to weigh 43.3 grams. It was a light-cream-colored powder which decomposed before melting on heating to a high temperature. It underwent no apparent change when heated one hour at 150° C. A tin analysis showed it to contain 67.10 per cent tin. The calculated tin content of the normal salt is 29.3 per cent.

EXAMPLE 3

STANNOUS COMPLEX OF BETA-NAPHTHOL

Thirty-six grams (.25 mol) of beta-naphthol and 56.4 grams of $SnCl_2.2H_2O$ (.25 mol) were dissolved in 300 cubic centimeters of 95 per cent ethanol. A solution of 20 grams (.5 mol) of sodium hydroxide in 250 cubic centimeters of 50 per cent ethanol was added very slowly during stirring. The product was filtered off, washed with alcohol and water, and then dried. It was a light-cream-colored solid which weighed 40 grams. It decomposed before melting or heating to a high temperature but underwent no apparent change when heated one hour at 150° C. The tin content was 73.10 per cent. The calculated tin content for the normal salt is 29.3%.

EXAMPLE 4

STANNOUS COMPLEX OF O-CHLOROPHENOL

Sixty-four and one-quarter grams of o-chlorophenol were dissolved in a solution of 20.6 grams of sodium hydroxide in 200 cubic centimeters of water. A solution of 47.4 grams of stannous chloride (anhydrous) in 100 cubic centimeters of water was added to this. An oily precipitate settled to the bottom. It was washed by decantation and then separated from the water and dried. It was a white solid which decomposed before melting on heating to a high temperature over an open flame but, apparently, was stable when heated one hour at 150° C. The yield was 55 grams. It was found by analysis to contain 53.45 per cent tin. The calculated tin content of the normal stannous salt is 31.8%.

EXAMPLE 5

STANNOUS COMPLEX OF P-PHENYLPHENOL

One hundred and seventy grams of p-phenylphenol were dissolved in one liter of 95 per cent ethanol. A solution of 40 grams of sodium hydroxide in 300 cubic centimeters of water was then added. A solution of 94.8 grams of stannous chloride (anhydrous) in 50 per cent ethanol was added to the former solution slowly during stirring. The resulting precipitate was filtered, washed twice with 500 cubic centimeter portions of alcohol and once with water. The yield of dried product was 83 grams. It was a very light yellow solid which decomposed on heating to a high temperature on a spatula. It was, apparently, stable when heated one hour at 150° C. It was found to contain 64.15 per cent tin. The calculated tin content of the normal stannous salt is 25.9 per cent. The chlorine content was .36 per cent.

EXAMPLE 6

STANNOUS COMPLEX OF P-CYCLOHEXYLPHENOL

An alcohol-water solution of 52.8 grams of p-cyclohexylphenol and 24.0 grams of sodium hydroxide was prepared. To this was added, with stirring, a solution of 56.8 grams of stannous chloride (anhydrous) in alcohol. The precipitate was filtered and then washed with alcohol and water. The yield was 52.0 grams. The cream-colored product decomposed before melting when heated over an open flame. It underwent no apparent change when heated one hour at 150° C. It contained 75.85 per cent tin and 10.3 per cent chlorine. The calculated tin content for the normal salt is 25.3 per cent.

The ortho-dihydroxyphenols, such as catechol, form a compound analyzing close to the normal stannous salt when reacted with equivalent amounts of stannous chloride and alkali. However, the other polyhydroxy aromatic compounds, such as resorcinol, etc., form complexes which are much higher in tin than the normal salt. The following example is illustrative:

EXAMPLE 7

STANNOUS COMPLEX OF HYDROQUINONE

Fifty-five grams of hydroquinone and 112.8 grams of stannous chloride dihydrate were dissolved in one liter of water. A solution of 40 grams of sodium hydroxide in 150 cubic centimeters of water was slowly added until the solution was alkaline. This required about 75 per cent of the solution. After stirring a short time, the product was filtered. The yield was 78 grams. The product, a light-cream-colored solid, was, apparently, unchanged by heating one hour at 150° C. It decomposed on heating at a high temperature on a spatula. Analysis for tin showed it to contain 70.45 per cent. It contained 14.75 per cent chlorine. The calculated tin content for the normal salt is 52.3 per cent.

EXAMPLES 8-13

STANNOUS COMPLEXES OF PHENOLS PREPARED BY FOLLOWING GENERAL METHOD

The following general method was employed in producing stannous complexes of:

p-Tertiary-octylphenol
p-Cyclohexylphenol
p-Tertiary-butylphenol
Petroleum cresylic acid
4,6-di-tertiary-butyl-m-cresol
2,6-di-tertiary-butyl-p-cresol Three-tenths of a mol of sodium hydroxide (dissolved in water) was added to .3 mol of the phenol dissolved in 95 per cent ethanol. Then .15 mol (28.4 grams) of anhydrous stannous chloride in ethanol-water was added slowly during stirring. The precipitate was filtered, washed with alcohol and water, and dried.

The complexes thus obtained were light in color and contained more tin than the normal stannous salts of these phenols.

In general, the procedure for the production of the stannous complexes may be given as reaction of the stannous salt with a phenolic compound and up to the equivalent amount of alkali. The amount of phenolic compound used may be varied over wide limits, and there is no harm in using a large excess (much greater than one molecular equivalent) and as little as 0.5 molecular equivalent of the phenol. Examples 3 and 6 illustrate the use of less than a molecular equivalent of phenol. Perhaps less than 0.5 molecular equivalent of the phenol would be sufficient if conditions were properly controlled because only a small amount of phenolic material is combined in the tin complex. There should be at least substantially one molecular equivalent of alkali present for each molecular equivalent of the stannous salt.

It is preferable to use a solvent that is a solvent for all of the reactants. Suitable solvents include methanol, ethanol, dioxane, water, glycol, etc., and mixtures of these.

Although in the majority of the above examples the stannous chloride is added to the phenolic compound and alkali, Example 3 illustrates the mixing of the stannous chloride and the phenolic compound before addition of the alkali.

The stabilizers of this invention referred to in the following tables were prepared according to the methods of the foregoing examples. The beta-naphthol complex was prepared according to Example 2.

The stabilizing effect of the tin complexes on GR–S, cured or uncured, when exposed to heat was tested. The vulcanizates were also exposed to ultraviolet light to evaluate their resistance to discoloration. They stabilize without appreciable discoloration. The following tests illustrate the stabilizing effect and particularly as compared with phenyl-beta-naphthylamine, a stabilizer widely used commercially for such a rubber.

The first table compares the stabilizing effect of several complexes with that of phenyl-beta-naphthylamine on drying latex coagulum which contains 2 per cent of stabilizer and also illustrates the stabilizing effect on aging at elevated temperatures. The table not only shows that the stabilizers are nondiscoloring but also shows that there was no appreciable change in the physical properties of the copolymer on aging. The control containing phenyl-beta-naphthylamine showed some deterioration. The data in the table consist of an observation of the color and the results of a hand test. This hand test consisted of pulling and feeling the copolymer sample to detect any stiffening, softening or other signs of deterioration. Tests recorded for the material aged 4 days include a test on the Firestone extrusion plastometer described in Dillon et al. 2,045,548. The figures given are the number of seconds required to extrude a constant volume of rubber through a given opening by action of a piston activated by a constant pressure of 4¼ pounds' steam at a constant temperature of 185° F.

Table I
COPOLYMER AGING

| Antioxidant | Condition After Drying | | After Four Days at 90° C. | | | After Two Days at 120° C. | |
|---|---|---|---|---|---|---|---|
| | Color | Hand Test | T4¼ | Color | Hand Test | Color | Hand Test |
| stannous complex of phenol | white | no deterioration | 8.0 | light brown | unchanged | light brown | unchanged. |
| stannous complex of o-chlorophenol | do | do | 8.0 | do | do | do | Do. |
| stannous complex of p-phenylphenol | do | do | 6.0 | very light brown | do | do | Do. |
| phenyl-beta-naphthylamine (control) | brown | do | 5.6 | brown | do | dark brown | somewhat set up. |

The data in the above table show the stannous complexes to be equal to phenyl-beta-naphthylamine on aging at 90° C. and superior on aging at 120° C. In color, all of the samples containing the stannous complexes are quite superior to those containing phenyl-beta-naphthylamine. The samples were all coagulated from the copolymerization emulsion mixture by the use of aluminum sulfate low in iron.

The next table compares the stabilizing effect of several of the complexes with that of phenyl-beta-naphthylamine when mixed with the emulsion resulting from the copolymerization reaction. Two percent of the stabilizer was used in each case.

Table II
COPOLYMER AGING

| Antioxidant | Condition After Drying, Color and Hand Test | After Aging 2 Days at 90° C., Color and Hand Test | After Aging 4 Days at 90° C., Color and Hand Test |
|---|---|---|---|
| stannous complex of beta-naphthol (prepared according to the process of Example 2) | cream color; no deterioration | cream color; unchanged | light yellow; unchanged. |
| stannous complex of beta-naphthol (prepared according to the process of Example 3) | do | do | cream color; unchanged. |
| stannous complex of 4,6-di-tertiary-butyl-m-cresol | light yellow; no deterioration | light brown; unchanged | light brown; unchanged. |
| phenyl-beta-naphthylamine | light red-brown; no deterioration | brown; unchanged | brown; somewhat set up. |

The results recorded in the above table show the tin complexes to be superior to the control stabilizer, phenyl-beta-naphthylamine, on drying and under both conditions of aging.

It was found that a mixture of a phenolic compound and the stannous complex gave results somewhat superior to the use of either one alone. For convenience, the tests refer to mixture of a complex and the phenol from which the complex is prepared, but other phenols may be used. Stabilizing mixtures of phenols and complexes are illustrated in the following table:

Table III

COPOLYMER AGING

| Antioxidant | After Drying 20 Hours at 75° C., Color and Hand Test | After Aging 4 Days at 90° C., Color and Hand Test | After Aging 1 Day at 120° C., Color and Hand Test |
|---|---|---|---|
| 2% 2,6-di-tertiary-butyl-p-cresol | yellow; no deterioration | orange-yellow; unchanged | light brown; set up. |
| 2% stannous complex of 2,6-di-tertiary-butyl-p-cresol | light brown; no deterioration | light yellow-brown; unchanged | light brown; surface slightly resinous. |
| 1% 2,6-di-tertiary-butyl-p-cresol+1% stannous complex of same | very light brown; no deterioration | light brown; unchanged | light brown; unchanged. |
| 2% stannous complex of beta-naphthol | cream color; no deterioration | light yellow; unchanged | brown; surface somwhat resinous. |
| 1% beta-naphthol+1% stannous complex of same | light cream; no deterioration | cream; unchanged | cream; unchanged. |
| beta-naphthol | very light brown; no deterioration | brown; unchanged | brown; somewhat set up. |

The results recorded above show that the mixture of the phenol and stannous complex give better stabilization than either alone.

The next table shows the stabilizing effect of stannous complexes of polyhydroxy phenolic compounds. The results of testing in a Firestone extrusion plastometer are recorded as above.

Table IV

COPOLYMER AGING

| | 2% stannous complex of hydroquinone | 2% phenyl-beta-naphthylamine | 2% Stalite |
|---|---|---|---|
| Condition after drying 20 hours at 75° C.: | | | |
| T4¼ | 37.0 | 7.8 | 8.0. |
| Color | light cream | brown | green-gray. |
| Hand test | no deterioration | no deterioration | no deterioration. |
| Heating 2 days at 110° C.: | | | |
| T4¼ | 18.8 | 71.6 | 26.4. |
| Color | light brown | brown | brown. |
| Hand test | unchanged | unchanged | slightly set up. |
| Heating 4 days at 110° C.: | | | |
| T4¼ | 52.8 | 134.2 | 309.6. |
| Color | light brown | brown | brown. |
| Hand test | unchanged | slightly set up | set up. |

The above data show that the stannous complex of hydroquinone is superior to phenyl-beta-naphthylamine as a stabilizer for the uncured copolymer and show a definite superiority of the stannous complex as compared with Stalite (heptylated diphenylamine), a widely used stabilizer for GR-S.

The stabilizers were compounded with vulcanizing ingredients according to two formulae. In one formula channel black was used, and the results of the test with this formula show the effect of the presence of the stabilizer in an ordinary stock. The other formula contains no black and is heavily loaded with zinc oxide, titanium dioxide, and Calcene (a finely divided calcium carbonate supplied by Pittsburgh Plate Glass Company). Tests with this latter stock show the stabilizers of this invention to be nondiscoloring. In both formulae, GR-S copolymer was employed to which 2 per cent of the various stabilizers was added while the copolymer was still in the form of latex and before coagulation and drying.

Formula I

| | |
|---|---|
| Copolymer + stabilizer | 100 |
| Bardol | 3 |
| Pine tar | 3 |
| Stearic acid | 3 |
| Zinc oxide | 5 |
| Cyclohexyl benzothiazyl sulfenamide | 1.2 |
| Channel black | 50 |
| Sulfur | 2 |

The Bardol of the above formula is a coal-tar plasticizer.

In the following table tests on the physical properties of different vulcanizates are recorded. The values are averages of those obtained on stock cured 60 and 80 minutes, respectively, at 280° F.

Table V

PROPERTIES OF VULCANIZATION

| | Stannous complex of p-phenyl-phenol | Phenyl-beta-naphthylamine |
|---|---|---|
| Tensile: | | |
| Normal | 3,100 | 3,175 |
| Aged | 2,150 | 1,875 |
| Percent of Normal | 69.4 | 59.1 |
| Elongation: | | |
| Normal | 585 | 605 |
| Aged | 300 | 310 |
| Percent of Normal | 51.3 | 51.2 |

The aging was carried on for 10 hours in an air bomb at 260° F. under 60 pounds' air pressure. The results of the tests show that compared to phenyl-beta-naphthylamine the stannous complex gave better retention of tensile on aging and about the same elongation retention.

The following table records tests on the physical properties of vulcanizates stabilized with 2 per cent of different stabilizers. The values given are averages of cures obtained at 280° F. for 40, 60, 80, and 120 minutes, respectively.

Table VI
PROPERTIES OF VULCANIZATION

|  | 1% beta-naphthol+1% of stannous complex of same | Phenyl-beta-naphthylamine |
|---|---|---|
| 200% Modulus: |  |  |
| Normal | 475 | 580 |
| Aged | 1,505 | 1,680 |
| Tensile: |  |  |
| Normal | 2,590 | 2,495 |
| Aged | 2,495 | 2,360 |
| Percent of Normal | 96.0 | 94.5 |
| Elongation: |  |  |
| Normal | 675 | 610 |
| Aged | 320 | 285 |
| Percent of Normal | 47.4 | 46.7 |

The above data show that the stabilizer used gives retention of modulus, tensile, and elongation on aging which is comparable to that given by the widely approved phenyl-beta-naphthylamine.

A further test was run to compare the stabilizing effect of a different stabilizer with that of phenyl-beta-naphthylamine. Two per cent of each stabilizer was employed. The values recorded are the average of cures made at 280° F. for 80 and 120 minutes, respectively.

Table VII
PROPERTIES OF VULCANIZATION

|  | Stannous complex of hydroquinone | Phenyl-beta-naphthylamine |
|---|---|---|
| 200% Modulus: |  |  |
| Normal | 610 | 740 |
| Aged | 1,400 | 1,950 |
| Percent of Normal | 229 | 264 |
| Tensile: |  |  |
| Normal | 2,500 | 2,700 |
| Aged | 2,125 | 2,325 |
| Percent of Normal | 85.0 | 86.2 |
| Elongation: |  |  |
| Normal | 570 | 520 |
| Aged | 275 | 240 |
| Percent of Normal | 47.3 | 46.2 |

The results show that the stannous complex is superior to phenyl-beta-naphthylamine from the standpoint of modulus retention and about equivalent in tensile and elongation retention.

In compounding the GR-S for tests in white stock, 2 per cent of various stabilizers was added to latex of GR-S copolymer before coagulation. The dried copolymer was then compounded as follows:

Formula II

| | |
|---|---|
| Copolymer+stabilizer | 100 |
| Stearic acid | 1 |
| Paraffin wax | 0.5 |
| Calcene | 50 |
| Zinc oxide | 5 |
| Titanium dioxide | 8 |
| Sunproof wax | 1.8 |
| Green dye | 2 |
| Cumar | 2.5 |
| Accelerator #1 | 1.3 |
| Accelerator #2 | 0.1 |
| Sulfur | 1.5 |

The Calcene is finely divided calcium carbonate produced by Pittsburgh Plate Glass Company. Accelerator #1 is cyclohexyl benzothiazyl sulfenamide. Accelerator #2 is tetramethylthiuram disulfide.

Samples of the white vulcanizate were cured 280° F. for 30 and 60 minutes, respectively, and then exposed in a fadeometer for 24 hours at 125° F. with the following results:

Table VIII
VULCANIZATE AGING

| Antioxidant | Color of Aged Vulcanizate |
|---|---|
| 2% stannous complex of p-phenylphenol | slightly discolored. |
| 1% 2,6-di-tertiary-butyl-p-cresol+1% stannous complex of same. | very slightly discolored. |
| 1% beta-naphthol+1% stannous complex of same. | slightly discolored. |
| 2% stannous complex of hydroquinone | Do. |
| 2% heptylated diphenylamine (control) | light brown. |
| di-beta-naphthyl-p-phenylene diamine (control). | very dark brown. |

The recorded results show that the stabilizers of this invention discolor only slightly as compared with two different commercial stabilizers and that the stabilizers of this invention may, therefore, be classified as nondiscoloring.

The foregoing is illustrative. The stannous complexes may be used alone or with a phenol. The stabilizers may be used not only for the stabilization of GR-S and other copolymers of conjugated diene monomer and vinyl monomer, but also natural rubber, etc. They may be added to the latex or compounded on the mill with dried latex coagulum or crepe, etc. They have particular value as nondiscoloring stabilizers for white GR-S or other copolymer of a conjugated diene monomer and a vinyl aromatic monomer.

This application is a division of my co-pending application Serial No. 85,473 filed April 4, 1949, now Patent No. 2,626,954 which claims the stannous complexes and their preparation.

What is claimed is:

1. The method of curing rubber-like copolymer of a conjugated diene monomer and a vinyl aromatic monomer without substantial discoloration which comprises heating the same with vulcanizing ingredients including sulfur and as stabilizer a stannous complex of a phenolic compound produced by reaction of the stannous salt of a strong acid, an alkali and a phenolic compound of the class which consists of monohydroxy aromatic compounds and polyhydroxy aromatic compounds except those which contain ortho hydroxy groups, which complex contains more tin than the normal stannous salt of the phenolic compound.

2. The method of drying rubber-like coagulum of copolymer of butadiene and styrene without substantial discoloration which comprises heating the same while it contains admixed therein sulfur and as stabilizer a stannous complex of a phenolic compound produced by reaction of the stannous salt of a strong acid, an alkali and a phenolic compound of the class which consists of monohydroxy aromatic compounds and polyhydroxy aromatic compounds except those which contain ortho hydroxy groups, which complex contains more tin than the stannous salt of the phenolic compounds.

3. Dried coagulum of rubber-like copolymer of butadiene and styrene which contains as a stabilizer a stannous complex of a phenolic compound produced by reaction of the stannous salt of a strong acid, an alkali and a phenolic compound of the class which consists of monohydroxy aromatic compounds and polyhydroxy aromatic compounds except those which contain ortho hydroxy groups, which complex contains more tin than the stannous salt of the phenolic compound.

4. Latex of a rubber-like copolymer of conjugated diene monomer and vinyl aromatic monomer which contains as a stabilizer a stannous complex of a phenolic compound produced by reaction of the stannous salt of a strong acid, an alkali and a phenolic compound of the class which consists of monohydroxy aromatic compounds and polyhydroxy aromatic compounds except those which contain ortho hydroxy groups, which complex contains more tin than the stannous salt of the phenolic compound.

5. The method of curing rubber and rubber-like copolymer of a conjugated diene monomer and a vinyl aromatic monomer which comprises heating the same with vulcanizing ingredients and as a stabilizer a stannous complex of a phenolic compound produced by reaction of a stannous salt of a strong acid, an alkali and a phenolic compound of the class which consists of monohydroxy aromatic compounds and polyhydroxy aromatic compounds except those which contain ortho hydroxy groups, which complex contains more tin than the normal stannous salt of the phenolic compound.

6. A substance of the group consisting of rubber and rubber-like copolymer of a conjugated diene monomer and a vinyl aromatic monomer stabilized with a stannous complex of a phenolic compound produced by reaction of a stannous salt of a strong acid, an alkali and a phenolic compound of the class which consists of monohydroxy aromatic compounds and polyhydroxy aromatic compounds except those which contain ortho hydroxy groups, which complex contains more tin than the stannous salt of the phenolic compound.

No references cited.